(12) United States Patent
Green

(10) Patent No.: US 12,257,982 B2
(45) Date of Patent: Mar. 25, 2025

(54) FOOD AND BEVERAGE CARRIER

(71) Applicant: Stanton Industries, Lakewood, NJ (US)

(72) Inventor: Christopher S. Green, Lakewood, NJ (US)

( * ) Notice: Subject to any disclaimer, the term of this patent is extended or adjusted under 35 U.S.C. 154(b) by 401 days.

(21) Appl. No.: 17/522,551

(22) Filed: Nov. 9, 2021

(65) Prior Publication Data

US 2023/0146567 A1 May 11, 2023

(51) Int. Cl.
*B60R 7/04* (2006.01)
*A45C 11/20* (2006.01)
*A45C 13/02* (2006.01)
*B65D 81/38* (2006.01)
*F16M 13/02* (2006.01)

(52) U.S. Cl.
CPC .............. *B60R 7/043* (2013.01); *A45C 11/20* (2013.01); *A45C 13/02* (2013.01); *B65D 81/3813* (2013.01); *F16M 13/02* (2013.01)

(58) Field of Classification Search
CPC ........... B60R 7/043; B60N 3/103; F25D 3/08; A45C 11/20
See application file for complete search history.

(56) References Cited

U.S. PATENT DOCUMENTS

| | | |
|---|---|---|
| 4,512,503 A | 4/1985 | Gioso |
| 4,819,793 A * | 4/1989 | Willard .................... A45C 3/04 383/110 |
| 4,884,733 A * | 12/1989 | Geeves .................. A45C 11/00 206/335 |
| 5,551,616 A | 9/1996 | Stitt et al. |
| 5,660,310 A | 8/1997 | Legrow |
| D427,139 S * | 6/2000 | Noval ........................... D12/419 |
| 6,135,546 A * | 10/2000 | Demtchouk ........... B60N 3/002 297/135 |
| 6,296,165 B1 | 10/2001 | Mears |
| 6,422,440 B1 | 7/2002 | Stone |
| 6,578,496 B2 | 6/2003 | Guard et al. |

(Continued)

FOREIGN PATENT DOCUMENTS

EP 2873626 A1 * 5/2015 ............. B60R 7/043

OTHER PUBLICATIONS

Newegg. "Big Ant Car Trash Bag for Little Leak Proof—Car Garbage Bag with Lid and Storage Pockets—Black / White" https://www.newegg.com/p/0UY-00T4-00002?Item= 9SIAPNGFU16682&utm_medium=Email&utm_source=ShellShocker &cm_mmc=EMC-SD102021-_-SD10062021-_-Item-_- 9SIAPNGFU16682&tp=i-1NHD-Q7H-1Hk-6vHWh5-2G-BDQy- 1c-Gn1-6crc64-l6d7ypc4zu-15xt9E&om_rid=6343225399&om_ mid=4944&email64=ZWpyMkBvdXRsb29rLmNvbQ%3d%3d.

(Continued)

*Primary Examiner* — Justin M Larson
(74) *Attorney, Agent, or Firm* — Christopher Stanton Green

(57) ABSTRACT

A carrier for holding food and at least one drink is disclosed wherein the carrier comprises a housing having a top opening, the housing being adapted to have placed therein prepared food from a supplier of cooked take-out food; a lid portion, the lid portion being mateable to the housing such that the lid portion covers at least a portion of the top opening when mated to the housing, the lid having therein a receptacle area for accepting a separate drink carrier that is adapted to hold a plurality of drinks, at least two of the plurality of drinks being holdable in respective individual accommodations of the drink carrier; and at least one strap coupled to the housing for fastening the carrier to a vehicle.

15 Claims, 7 Drawing Sheets

(56) References Cited

U.S. PATENT DOCUMENTS

| | | | |
|---|---|---|---|
| 6,851,276 B2 * | 2/2005 | Perrins | A45C 11/20 |
| | | | 62/530 |
| 6,851,375 B2 | 2/2005 | Guard et al. | |
| 7,313,927 B2 | 1/2008 | Barker | |
| 7,318,380 B2 | 1/2008 | Guard et al. | |
| 7,328,941 B2 | 2/2008 | Asbach et al. | |
| 7,490,558 B2 | 2/2009 | Asbach et al. | |
| 7,871,125 B2 | 1/2011 | Asbach et al. | |
| 8,281,950 B2 | 10/2012 | Potts et al. | |
| 8,899,071 B2 * | 12/2014 | Mogil | A45C 11/20 |
| | | | 62/457.7 |
| 8,910,841 B2 | 12/2014 | Genung | |
| 8,997,995 B2 * | 4/2015 | Chitsazan | A47G 23/0208 |
| | | | 206/541 |
| 9,084,463 B2 | 7/2015 | Merrill | |
| 9,227,768 B2 * | 1/2016 | Quick | B65D 33/14 |
| 9,387,786 B2 | 7/2016 | Weiner et al. | |
| 9,422,099 B2 * | 8/2016 | Mitchell | A45C 13/30 |
| D774,369 S * | 12/2016 | Harris | D7/708 |
| 9,809,376 B2 | 11/2017 | Mitchell et al. | |
| 10,214,130 B2 | 2/2019 | DeLeon | |
| 10,730,684 B2 * | 8/2020 | Mitchell | A45F 3/02 |
| 10,967,803 B1 * | 4/2021 | Siciliano | B65D 21/0212 |
| 11,297,920 B2 * | 4/2022 | Royce | A45C 3/10 |
| 11,490,768 B1 * | 11/2022 | Ippolito | B60N 3/103 |
| 11,787,344 B2 * | 10/2023 | Meador | B60R 7/08 |
| | | | 224/542 |
| 2004/0025530 A1 | 2/2004 | Perrins | |
| 2005/0126445 A1 | 6/2005 | Guard et al. | |
| 2005/0210912 A1 | 9/2005 | Mogil et al. | |
| 2006/0196218 A1 | 9/2006 | Mogil et al. | |
| 2007/0131568 A1 * | 6/2007 | Georgia | B60R 7/043 |
| | | | 206/234 |
| 2015/0151661 A1 | 6/2015 | Morel et al. | |
| 2015/0343933 A1 | 12/2015 | Weiner et al. | |
| 2016/0231048 A1 | 8/2016 | Furr et al. | |
| 2017/0008688 A1 | 1/2017 | Barattin et al. | |
| 2017/0081082 A1 | 3/2017 | Murphy | |
| 2020/0121048 A1 | 4/2020 | Royce | |
| 2023/0042946 A1 * | 2/2023 | Vermeer | B60N 2/6063 |
| 2023/0097471 A1 * | 3/2023 | DeStasio | B60R 7/043 |
| | | | 224/542 |
| 2023/0115047 A1 * | 4/2023 | Meador | B60R 7/043 |
| | | | 414/267 |
| 2023/0146567 A1 * | 5/2023 | Green | B60R 7/043 |
| | | | 224/400 |

OTHER PUBLICATIONS

Newegg. "Big Ant Car Trash Can with Lid, Waterproof Auto Garbage Bin, Leak-Proof Car Storage Bag, Car Garbage Bag, Collapsible Car Trash Bin(Large, Black)" https://www.newegg.com/p/0UY-00T4-00001?Item=9SIAPNGFU14666.

Newegg. "Car Trunk Cargo Organizer SUV Bag Storage With Non-Slip Strips Secure Straps" https://www.newegg.com/p/0UY-00T1-00001?Item=9SIAVBKFK85007&utm_medium=Email&utm_source=ShellShocker&cm_mmc=EMC-SD102021-_-SD10122021-_-Item-_-9SIAVBKFK85007&tp=i-1NHD-Q7H-1Hk-6yLgPc-2G-BDQy-1c-Gn1-6crc64-l6ebDEbpjl-nnneA&om_rid=6388545076&om_mid=4944&email64=ZWpyMkBvdXRsb29rLmNvbQ%3d%3d.

International Search Report for PCT Application No. PCT/IB2022/060801 dated Feb. 9, 2023. The International Bureau of WIPO.

Written Opinion of the International Searching Authority for PCT Application No. PCT/IB2022/060801 dated Feb. 9, 2023. The International Bureau of WIPO.

* cited by examiner

FOOD AND BEVERAGE CARRIER

TECHNICAL FIELD

This invention relates to food and beverage carriers and, in particular, to food and beverage carriers that are particularly suitable for use in food deliveries from restaurants.

BACKGROUND OF THE INVENTION

As delivery of prepared food and drink is becoming more popular and mainstream with new phone applications making ordering easy and accessible, there are a number of issues that arise with food and drink delivery via vehicle transportation.

First, fountain drinks, which are often ordered, when placed in a vehicle as is often done to transport them, whether or not they are in a bag, are very susceptible to spilling, especially should they topple over or even just lean over when the vehicle turns or makes sudden moves. This can occur even when the fountain drink is placed in a box on the floor of the passenger cabin or in the trunk area. Such spills can make a mess in the vehicle and reduce the amount of the drink delivered to the customer, which might upset the customer and cost the driver his tip.

Thus, oftentimes, when a customer orders one or more fountain drinks, the delivery driver will put them into respective cup holders in the vehicle in an attempt to prevent spills. This is inconvenient and time consuming because the drinks must be removed from whatever they were being carried into the vehicle and then placed individually in the cup holders and at the delivery location the process must be removed. Also, regular vehicles usually have a limited number of cup holders and so may not be able to accommodate all of the drinks ordered. Furthermore, one or more of the fountain drinks that are ordered may be of such a size that it does not fit into the delivery driver's vehicle's cup holder, thus preventing use of this technique.

Second, during the time it takes to get the food from the source, e.g., a restaurant or take-out place, to the delivery destination, the temperature of food may be affected, where hot food may be delivered cold, and vice versa. This may be exacerbated when hot food is placed adjacent to cold drinks and vice-versa.

It would therefore be advantageous to provide a solution that would overcome the challenges noted above.

SUMMARY OF THE INVENTION

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a carrier for holding food and at least one drink. The carrier comprises a housing having a top opening, the housing being adapted to have placed therein prepared food from a supplier of cooked take-out food; a lid portion, the lid portion being mateable to the housing such that the lid portion covers at least a portion of the top opening when mated to the housing, the lid having therein a receptacle area for accepting a separate drink carrier that is adapted to hold a plurality of drinks, at least two of the plurality of drinks being holdable in respective individual accommodations of the drink carrier; and at least one strap coupled to the housing for fastening the carrier to a vehicle.

Certain embodiments disclosed herein include a carrier for holding food and at least one drink. The carrier comprises a housing having a top opening, the housing being adapted to have placed therein prepared food from a supplier of cooked take-out food; a shelf, the shelf being disposed within the housing to cover at least a portion of the area of the housing, the shelf having therein a receptacle area for accepting a separate drink carrier adapted to hold a plurality of drinks, at least two of the plurality of drinks being holdable in respective individual accommodations of the drink carrier; and at least one strap coupled to the housing for coupling the carrier to an vehicle.

Certain embodiments disclosed herein include a carrier for holding food and at least one drink. The carrier comprises a housing having a top opening, the housing being adapted to have placed therein prepared food from a supplier of prepared take-out food and drink; a lid, the lid being mateable to the housing to cover at least a portion of the top opening when mated to the housing, the lid having therein a receptacle area for accepting a separate drink carrier adapted to hold a plurality of drinks, at least two of the plurality of drinks being held in respective individual accommodations of the carrier; wherein at least one of the drinks is not a factory sealed drink; and at least one strap coupled to the housing for coupling the carrier to a vehicle.

DETAILED DESCRIPTION

Figure 1:
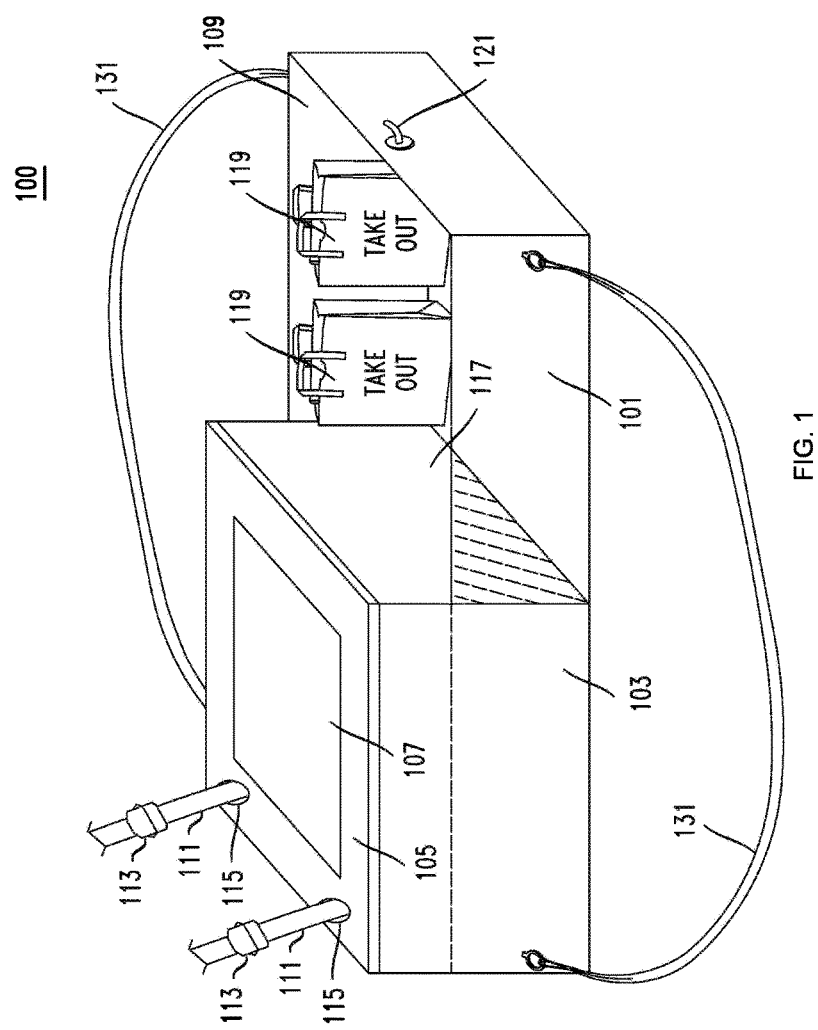
FIG. 1 shows a take-out carrier with a portion of the housing not covered by a lid.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views. The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, the drawings are not drawn to scale.

In the description, identically numbered components within different ones of the FIGS. refer to components that are substantially the same.

In order to avoid the above noted problems with delivering food and drink a carrier for food and drink is disclosed that includes an opening in a portion thereof to accept and hold a separate carrier that is adapted to hold a plurality of plurality of drinks, being especially useful for drinks such as fountain drinks such as is often supplied by a provider of cooked take-out food for delivery. In one embodiment, the portion that accepts the separate carrier may be a lid of the carrier, which may only be a partial covering of the carrier. In one embodiment, the portion that accepts the separate carrier may be a shelf located within the carrier, which may only be a partial shelf, i.e., a shelf that extends over only part of the interior of the carrier.

FIG. 1 shows take-out carrier 100 with a portion of housing 101 thereof not covered by lid. Housing 101 may be any shape, but for convenience of use in vehicles such as automobiles it may be box-shaped. In one embodiment, housing 101 may have at least a portion thereof, e.g., base portion 103, that is a hollow rectangular parallelepiped. In another embodiment, embodiment, housing 101 may have at least a portion thereof, e.g., base portion 103, that is cuboid shaped. In some embodiments, one of the faces of housing 101 may be curved, e.g., gently curved, so as to better align with a vehicle's seat back, which may have a gentle curve.

In one embodiment, housing 101 is made of substantially rigid materials so that it holds its shape even should it move around in a vehicle. Housing 101 may be insulated to reduce temperature change between housing 101 and the environment exterior thereto.

Lid 105 is mateable to housing 101. Housing 101 has at least one portion at the top thereof that is not sealed over, e.g., to allow access to the interior of housing 101. Lid 105 mates to housing 101 so as to cover at least a portion of its top opening. In FIG. 1 generally the portion of the top opening covered by lid 105 cannot be seen when lid 105 is in place, i.e., mated to cover the portion the top opening. However, the opening can be seen through receptacle area 107, which is an open portion of lid 105. Lid 105 may be insulated.

Portion 109 is another portion of the top opening of housing 101. Although FIG. 1 shows two different heights for two sections of the top opening of housing 101 such is not required. The housing may be all of the same height with the top opening being all the way across the top of housing 101. Furthermore, although lid 105 is shown in FIG. 1 as only extending across a portion of the top opening of housing 101, the amount that lid 105 extends is not limited to that which is shown but may be any amount, including being over the entirety of the top opening of housing 101. In one embodiment, part, or all of portion 109 may be covered by an additional lid portion or separate lid, not shown. Such additional lid portion or separate lid may be insulated to reduce temperature change within the portion of housing 101 covered by the additional lid portion or separate lid.

Figure 2:
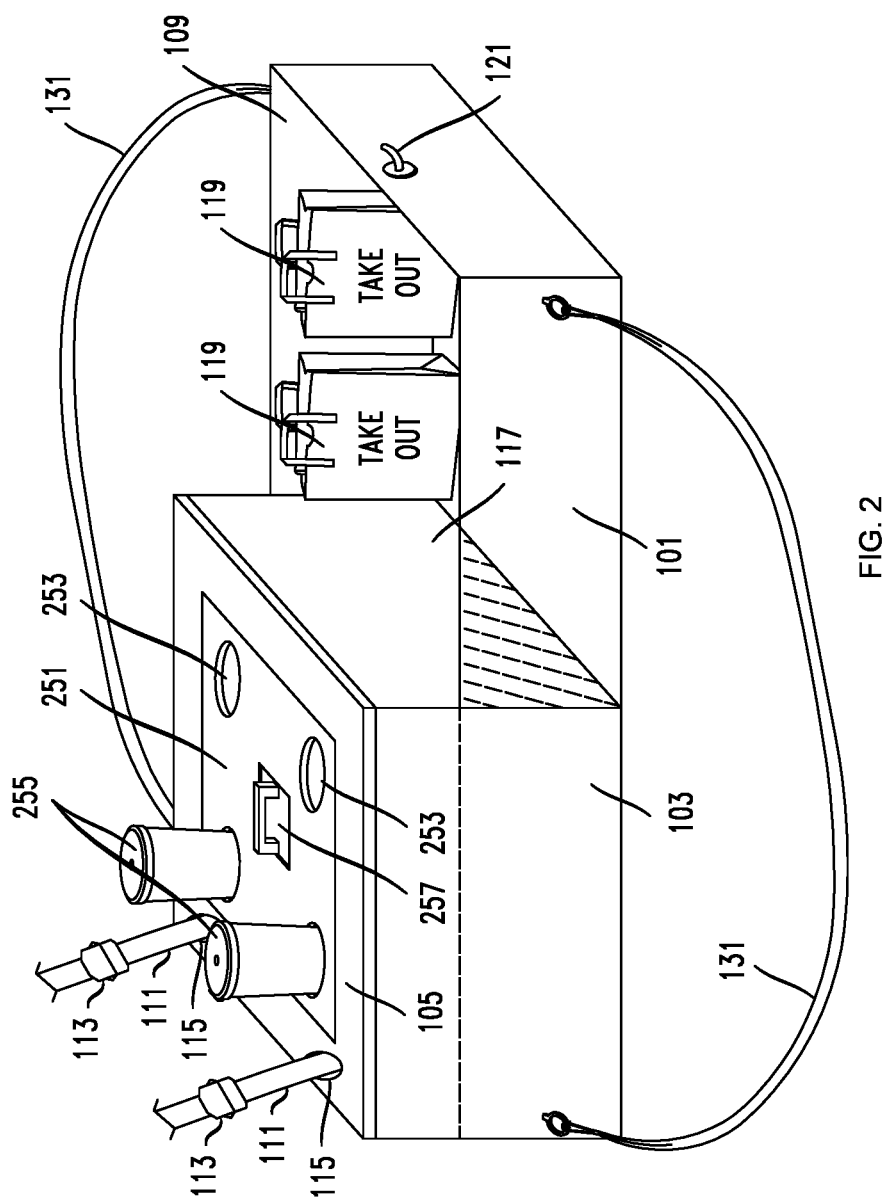
FIG. 2 shows the take-out carrier of FIG. 1 but with a drink carrier inserted into a receptacle area of lid portion.

Receptacle area 107 of lid 105 accepts a separate drink carrier that is adapted to hold a plurality of drinks, at least two of the plurality of drinks being held in respective individual accommodations, i.e., compartments, which are typically shaped like the bottom of drink containers, of the carrier. Receptacle area 107 of lid 105 is an opening through lid 105 that is sized to accept drink carrier 251 (FIG. 2). Drink carrier 251 is shown inserted into receptacle area 107 of lid 105 in FIG. 2.

Lid 105 may have various mechanisms therein or thereon that allow for the adjustment of the size of receptacle area 107 so as to be able to accommodate different drink carriers. One such mechanism may be sliding and locking panels.

At least one strap 111, two of which are shown in FIG. 1, are used to attach take-out carrier 100 to the vehicle in which it will be mounted, e.g., to a seat thereof. Typically, but not necessarily, at least one of straps 111 will have an arrangement for easily releasing take-out carrier 100 from the vehicle. Such an arrangement may include buckles or clips, e.g., buckles 113.

In one embodiment, at least one strap 111 is arranged so as to pass through opening 115 in lid 105. Doing so helps stabilize lid 105 to prevent spilling of the beverages in drink carrier 251 (FIG. 2).

In one embodiment, take-out carrier 100 may include at least one optional separating wall 117 to separate the area of take-out carrier 100 in which at least a portion of the drink containers extend into and another area of take-out carrier 100, e.g., in which food may be easily placed for transport and delivery. Optional separating wall 117 may be insulated, thus helping to prevent an exchange of heat between the food and the drinks and making it more likely that each will reach the customer to whom they are being delivered at a temperature closer to that at which they left the supplier of the take-out food. To this end, the other portions of take-out carrier 100 may also be insulated. As an example, FIG. 1 further shows food bags 119 within a section of take-out carrier 100 that is separated from the beverage location by separating wall 117. Although the take-out food is shown as represented as being in food bags 119 in FIG. 1, such use of a bag to contain food is not required. The take-out food may be placed directly into housing 101 in whatever containers are available or desirable. The location of separating wall 117 may be adjustable so as to accommodate more or less drinks and food items.

Also, although the take-out food is shown as being in only one section of take-out carrier 100, such is for illustration only and without limitation. It will be appreciated by those of ordinary skill in the art that take-out food may be placed on either side of optional separating wall 117, i.e., both where food bags 119 are shown as well as under lid 105, if so desired and space is available. Furthermore, the food may be placed in a synergistic manner so as to help keep hot drinks and hot food hot while keeping cold drinks and cold food cold. For example, if the food being delivered includes cold drinks, hot entrees, and cold desserts, e.g., ice cream sundaes, the ice cream could be placed on the side of separating wall 117 where the cold drinks are and the hot entrees placed on the other side of separating wall 117. Similarly, if the food being delivered includes hot drinks, salads, and hot entrees, the hot entrees could be placed on the side of separating wall 117 where the hot drinks are and the salads placed on the other side of separating wall 117.

Take-out carrier 100 may also include one or more hooks 121 for use in holding bags of food, e.g., shopping bags that have handles which can be placed on one of hooks 119. Hooks 119 may be retractable or otherwise moveable so that they do not stick out when not being used. Advantageously, when take-out carrier 100 is positioned on a seat of a vehicle it may be positioned such that hooks 121 extend beyond the seat bottom, so that any bags hung on hooks 121 are suspended thereby.

Optional straps 131 may be employed by a user to carry take-out carrier 100, e.g., from a vehicle to another location, e.g., a restaurant, a take-out place, a home, a picnic location, and the like, as well as vice-versa.

As noted above, FIG. 2 shows take-out carrier 100 of FIG. 1 but where drink carrier 251 is inserted into receptacle area 107 of lid 105 in FIG. 2. Drink carrier 251 is a separate unit that is adapted to hold a plurality of drinks, at least two of the plurality of drinks being holdable in respective individual accommodations 253 of carrier 251. FIG. 2 shows drink 255 within one of individual accommodations 253 of carrier 251. Drink carrier 251 may be a restaurant standard drink carrier such as is often given to a customer who purchases multiple drinks. Drink carrier 251 may be disposable.

Also shown in FIG. 2 is handle 257 which is part of drink carrier 251 and can be used by a driver to easily insert or remove drink carrier 251 from receptacle area 107 of lid 105.

Figure 3:
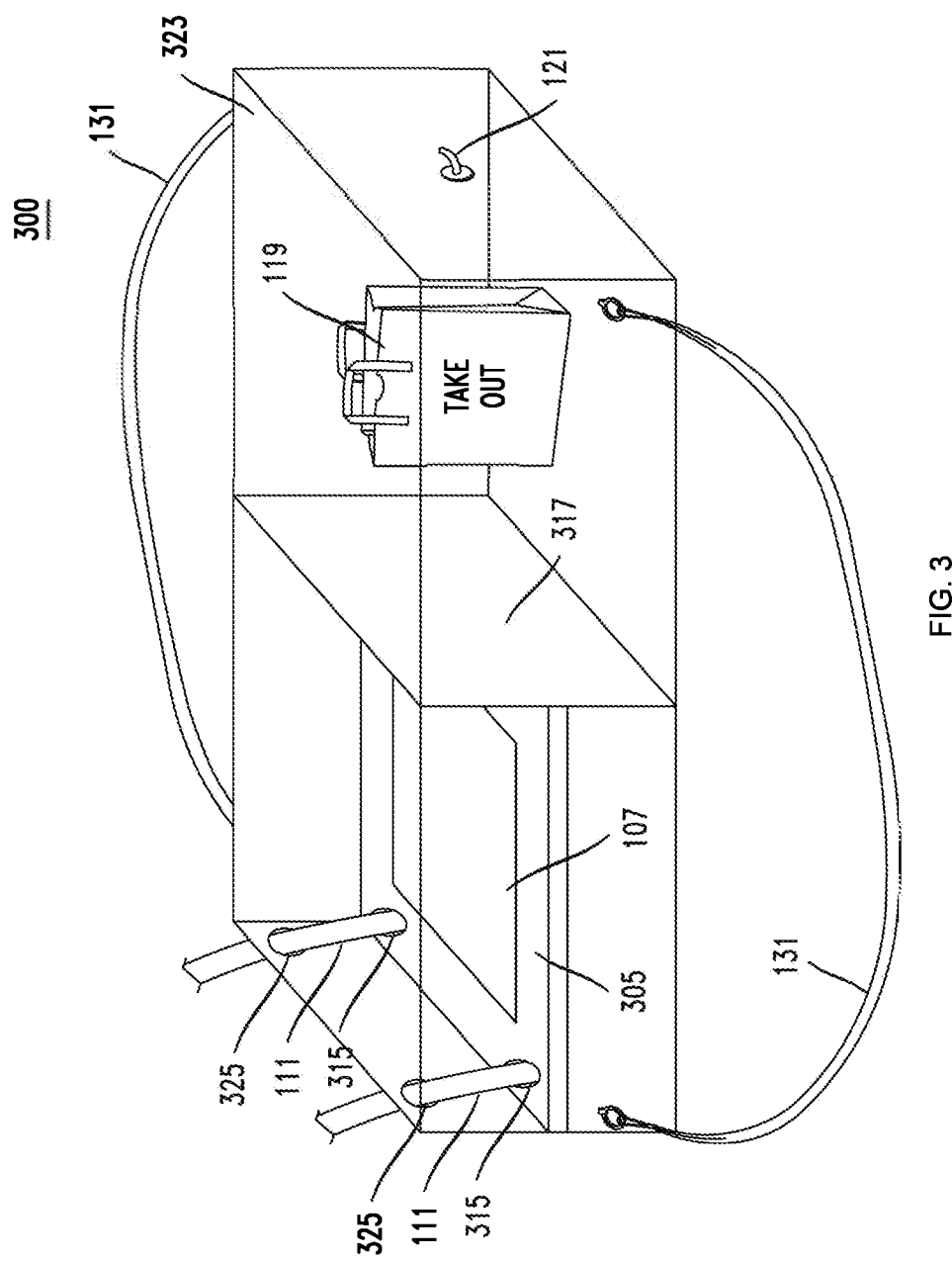
FIG. 3 shows a take-out carrier with a shelf interior thereto having a receptacle area for a drink carrier.

FIG. 3 shows a front three dimensional view of take-out carrier 300 where the front face can be seen through. In this embodiment, housing 301 may be any shape, but for convenience of use in vehicles such as automobiles it may be box-shaped, at least in its base. Similar to housing 101 (FIG. 1), housing 301 (FIG. 3) may have various shapes including a hollow rectangular parallelepiped and a cuboid shaped. Housing 301 may have a face that is curved, e.g., gently curved, so as to better align with a vehicle's seat back, which may have a gentle curve.

In one embodiment, housing 301 is made of substantially rigid materials so that it holds its shape even should it move around in a vehicle. Housing 301 may be insulated to reduce temperature change between housing 101 and the environment exterior thereto.

Shelf 305 is located interior to housing 301, e.g., at least somewhat below top face 323 of housing 301, which is open. Shelf 305 may be supported from below or may be supported by housing 301, e.g., by grooves within at least one wall of housing 301 or pegs (not shown) or supports (not shown) inserted into housing 301 or any known technique for supporting a shelf within a housing. Shelf 305 mates covers at least a portion housing 301. Shelf 305 may be insulated. The depth, or correspondingly the height, of shelf 305 within housing 301 is at the discretion of the implementer. In one embodiment, shelf 305 is placed so that the largest, i.e., the tallest, drink that is expected to be ordered for delivery will not have its top protrude beyond top face 323 of housing 301 so that a lid may be placed on top of housing 301 over at least shelf 305 when such a drink is inserted into drink carrier 251 (FIG. 4) that is inserted into receptacle area 107. Shelf 305 may be removable.

The amount that shelf 305 extends within housing 301, is not limited to that which is shown in FIG. 3 but may be any amount, and is at the discretion of the implementer.

Figure 4:
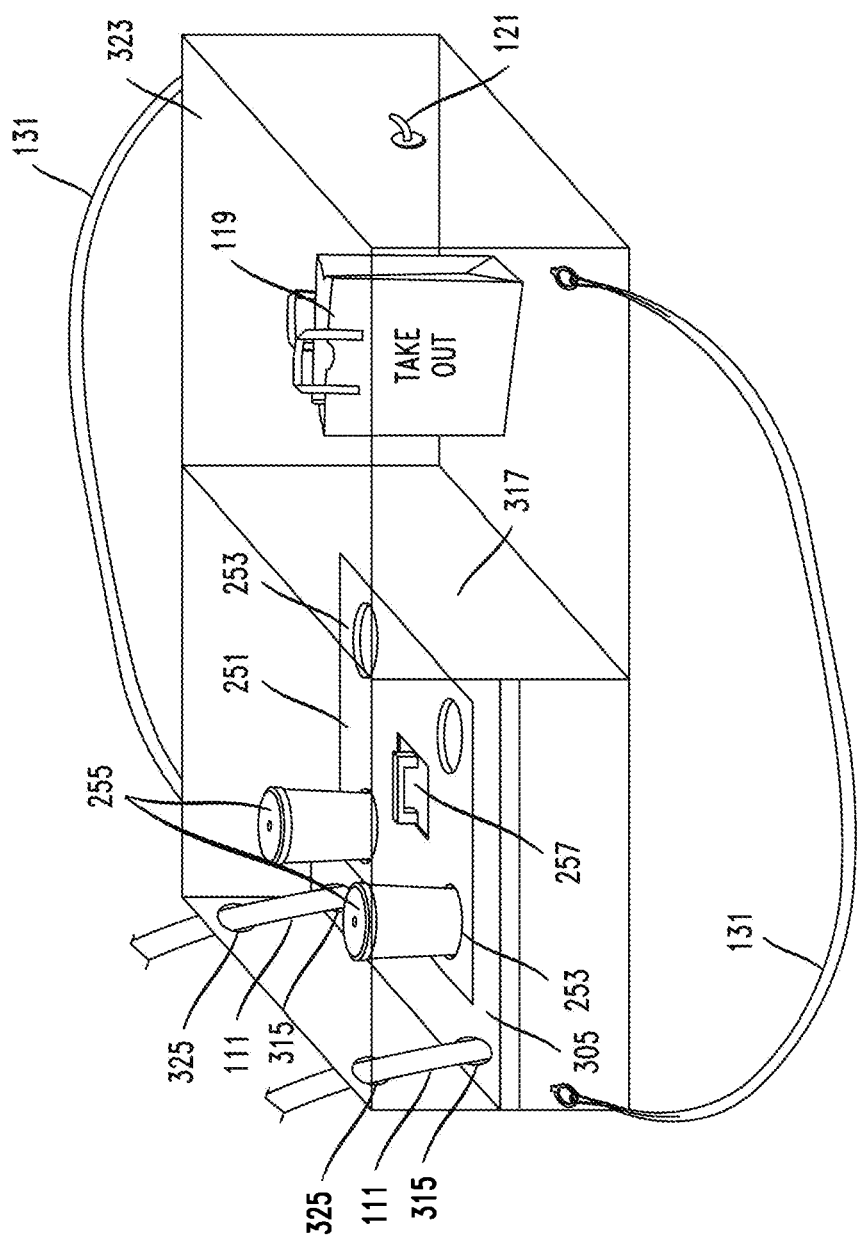
FIG. 4 shows the take-out carrier of FIG. 3 but with a drink carrier inserted into a receptacle area of lid portion.

As explained with regard to FIG. 1, receptacle area 107 of shelf 305 accepts a separate drink carrier that is adapted to hold a plurality of drinks, at least two of the plurality of drinks being held in respective individual accommodations, i.e., compartments, which are typically shaped like the bottom of drink containers, of the carrier. Receptacle area 107 of shelf 305 is an opening through shelf 305 that is sized to accept drink carrier 251 (FIG. 2 or FIG. 4). Drink carrier 251 is shown inserted into receptacle area 107 of shelf 305 in FIG. 4.

Shelf 305 may have various mechanism therein or thereon that allow for the adjustment of the size of receptacle area 107 so as to be able to accommodate different drink carriers. One such mechanism may be sliding and locking panels.

At least one strap 111, two of which are shown in FIG. 3, are used to attach take-out carrier 300 to the vehicle in which it will be mounted, e.g., to a seat thereof. Typically, but not necessarily, at least one of straps 111 will have an arrangement for easily releasing take-out carrier 300 from the vehicle. Such an arrangement may include buckles or clips, e.g., as shown in FIG. 1.

In one embodiment, at least one strap 111 is arranged so as to pass through opening 315 in shelf 305. Doing so helps stabilize shelf 305 to prevent spilling of the beverages in drink carrier 251 (FIG. 2). In one embodiment, at least one strap passes through a hole 325 of housing 301. Holes 325 may be in one or more faces of housing 301. Such an arrangement can further stabilize take-out carrier 300 within a vehicle. It further enables a lid (not shown) to be placed over take-out carrier 300 so as to cover it. Such a lid may be insulated.

In one embodiment, take-out carrier 300 includes at least one optional separating wall 317 to separate the area of take-out carrier 300 in which at least a portion of the drink containers extend into and another area of take-out carrier 300 in which food is placed for transport and deliver. Optional separating wall 317 may be insulated, thus helping to prevent an exchange of heat between the food and the drinks and making it more likely that each will reach the customer to whom they are being delivered at a temperature closer to that at which they left the supplier of the take-out food. To this end, the other portions of take-out carrier 300 may also be insulated.

FIG. 3 further shows food bag 319 within a section of take-out carrier 300 that is separated from the beverage location by separating wall 317. Although food is represented as being in bag 319 in FIG. 1, such use of a bag to contain food is not required. The food may be placed directly into housing 301 in whatever containers are available or desirable. The location of separating wall 317 may be adjustable so as to accommodate more or less drinks and food items. For example, there may be matching slots in opposing faces of housing 301 into which separating wall may be slid. By having several sets of such matching slots at different locations across housing 301, a driver may place separating wall 317 into whichever set of slots is appropriate for a particular delivery.

Depending on the height of shelf 305, it may also be possible to place additional food items below it.

Take-out carrier 300 may also include one or more hooks 121 for use in holding bags of food, e.g., shopping bags that have handles which can be placed on one of hooks 319. Hooks 319 may be retractable or otherwise moveable so that they do not stick out when not being used. Advantageously, when take-out carrier 300 is positioned on a seat of a vehicle it may be positioned such that hooks 121 extend beyond the seat bottom, so that any bags hung on hooks 121 are suspended thereby.

As noted above, FIG. 4 shows take-out carrier 300 of FIG. 1 but where drink carrier 251 is inserted into receptacle area 107 of shelf 305. Drink carrier 251 is a separate unit that is adapted to hold a plurality of drinks, at least two of the plurality of drinks being holdable in respective individual accommodations 253 of carrier 251. FIG. 4 shows drinks 255 each of which is within one of individual accommodations 253 of carrier 251. Also shown in FIG. 4 is handle 257 which is part of drink carrier 251 and can be used by a driver to easily insert or remove drink carrier 251 from receptacle area 107 of shelf 305. As described in connection with FIG. 2, drink carrier 251 may be a restaurant standard drink carrier such as is often given to a customer who purchases multiple drinks. Drink carrier 251 may be disposable.

Figure 5:
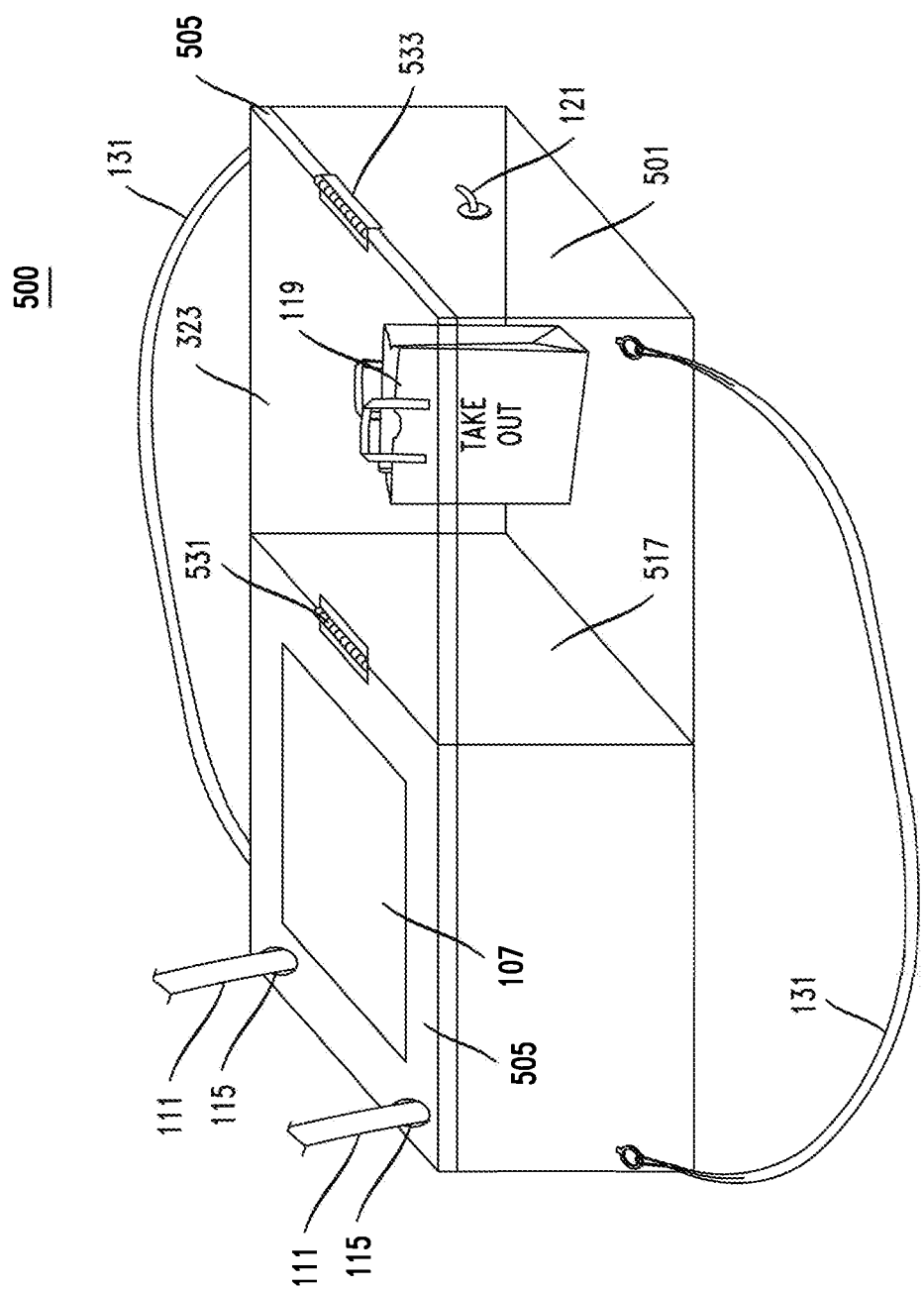
FIG. 5 shows a take-out carrier where the entirety of the housing is covered by a lid.

FIG. 5 shows a front three dimensional view of take-out carrier 500 where the front face can be seen through. In this embodiment, housing 501 may be any shape, but for convenience of use in vehicles such as automobiles it may be box-shaped, at least in its base. Similar to housing 101 (FIG. 1), housing 501 (FIG. 5) may have various shapes including a hollow rectangular parallelepiped and a cuboid shaped. Housing 501 may have a face that is curved, e.g., gently curved, so as to better align with a vehicle's seat back, which may have a gentle curve.

In one embodiment, housing 501 is made of substantially rigid materials so that it holds its shape even should it move around in a vehicle. Housing 501 may be insulated to reduce temperature change between housing 501 and the environment exterior thereto.

Lid 505 is mateable to housing 501. When lid 505 is mated to housing 501 it covers its top face 323 of housing 301, which is open. As such, when lid 505 is removed from housing 501, e.g., by a delivery driver, access to the interior of housing 501 may be had, e.g., to place therein food. Lid 505 may be insulated. In the embodiment of FIG. 5, lid 501 extends across the entirety of top face 323 of housing 301. In some embodiments, lid 501 may be segmented and at least one of the portions openable, so the access to the interior of housing 501 may be had by opening a portion of lid 505 while the other remains in position over housing 501. Such may be achieved by using a hinge between the portions, e.g., optional hinge 531. Typically, it will be the portion of lid 501 that does not contain receptacle area 107 that is openable, which will allow drink carrier 251 to be in place while yet allowing for access to the interior by opening the other portion. The division of the portions is at the discretion of the implementer. In one embodiment the division will be in the general area of optional separating wall 517.

Figure 6:
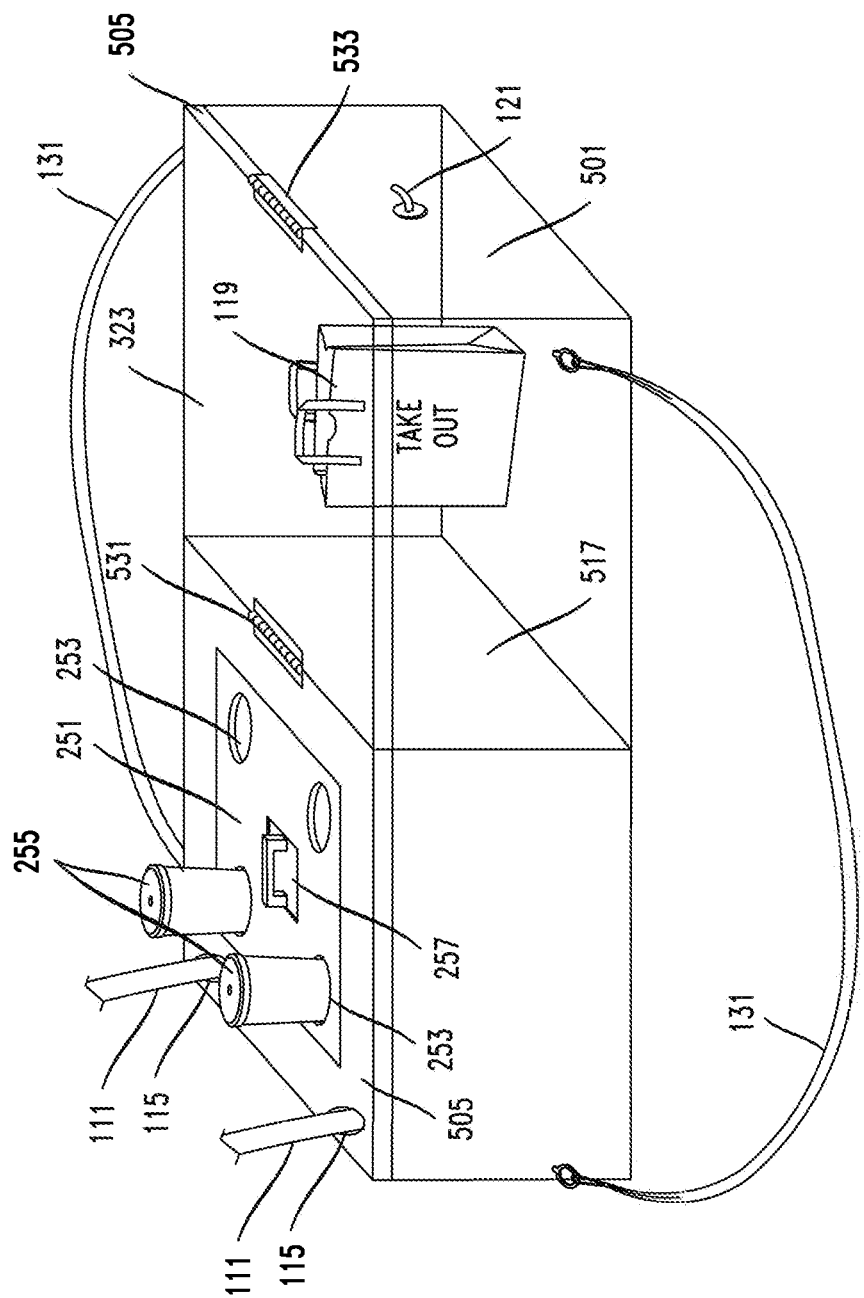
FIG. 6 shows the take-out carrier of FIG. 5 but with a drink carrier inserted into a receptacle area of the lid.

Receptacle area 107 of lid 505 accepts a separate drink carrier that is adapted to hold a plurality of drinks, at least two of the plurality of drinks being held in respective individual accommodations, i.e., compartments, which are typically shaped like the bottom of drink containers, of the carrier. Receptacle area 107 of lid 505 is an opening through lid 505 that is sized to accept drink carrier 251 (FIGS. 2, 4, and 6). Drink carrier 251 is shown inserted into receptacle area 107 of lid 505 in FIG. 6.

Lid 505 may have various mechanisms therein or thereon that allow for the adjustment of the size of receptacle area 107 so as to be able to accommodate different drink carriers. One such mechanism may be sliding and locking panels.

At least one strap 111, two of which are shown in FIG. 5, are used to attach take-out carrier 500 to the vehicle in which it will be mounted, e.g., to a seat thereof. Typically, but not necessarily, at least one of straps 111 will have an arrangement for easily releasing take-out carrier 500 from the vehicle. Such an arrangement may include buckles or clips, e.g., as shown in FIG. 1.

In one embodiment, at least one strap 111 is arranged so as to pass through opening 115 in lid 505. Doing so helps stabilize lid 505 to prevent spilling of the beverages in drink carrier 251 (FIG. 2).

In one embodiment, take-out carrier 500 includes at least one optional separating wall 517 to separate the area of take-out carrier 500 in which at least a portion of the drink containers extend into and another area of take-out carrier 500 in which food is placed for transport and delivery. Optional separating wall 517 may be insulated, thus helping to prevent an exchange of heat between the food and the drinks and making it more likely that each will reach the customer to whom they are being delivered at a temperature closer to that at which they left the supplier of the take-out food. To this end, the other portions of take-out carrier 500 may also be insulated.

For example, there may be matching slots in opposing faces of housing 501 into which separating wall may be slid. By having several sets of such matching slots at different locations across housing 501, a user may place separating wall 517 into whichever set of slots is appropriate, e.g., for a particular delivery.

As an example, FIG. 5 further shows food bag 119 within a section of take-out carrier 500 that is separated from the beverage location by separating wall 517. Although the take-out food is represented as being in food bag 119 in FIG. 5, such use of a bag to contain food is not required. The take-out food may be placed directly into housing 501 in whatever containers are available or desirable. The location of separating wall 517 may be adjustable so as to accommodate more or less drinks and food items.

Also, although the take-out food is shown as being in only one section of take-out carrier 500, such is for illustration only and without limitation. It will be appreciated by those of ordinary skill in the art that take-out food may be placed on either side of optional separating wall 517, i.e., both where food bags 519 are shown as well as under lid 505, if so desired and space is available. Furthermore, the food may be placed in a synergistic manner so as to help keep hot drinks and hot food hot while keeping cold drinks and cold food cold, e.g., in a manner as described hereinabove.

Take-out carrier 500 may also include one or more hooks 121 for use in holding bags of food, e.g., shopping bags that have handles which can be placed on one of hooks 119. Hooks 119 may be retractable or otherwise moveable so that they do not stick out when not being used. Advantageously, when take-out carrier 500 is positioned on a seat of a vehicle it may be positioned such that hooks 121 extend beyond the seat bottom, so that any bags hung on hooks 121 are suspended thereby.

As noted above, FIG. 6 shows take-out carrier 500 of FIG. 1 but where drink carrier 251 is inserted into receptacle area 107 of lid 505. Drink carrier 251 is a separate unit that is adapted to hold a plurality of drinks, at least two of the plurality of drinks being holdable in respective individual accommodations 253 of carrier 251. FIG. 6 shows drinks 255 each of which is within one of individual accommodations 253 of carrier 251. Also shown in FIG. 6 is handle 257 which is part of drink carrier 251 and can be used by a driver to easily insert or remove drink carrier 251 from receptacle area 107 of lid 505. As described in connection with FIGS. 2 and 4, drink carrier 251 may be a restaurant standard drink carrier such as is often given to a customer who purchases multiple drinks. Drink carrier 251 may be disposable.

In any of the above-described embodiments the various lids or portions thereof may be permanently attached to the respective housing, e.g., using hinges or similar mechanisms, such as optional hinge 533 shown in FIGS. 5 and 6, so that the lid or portion thereof remains permanently attached the housing yet access may be had to the interior of the housing.

The disclosed embodiments are particularly useful when the drinks are fountain drinks, coffee, tea, smoothies, and served ice cream, i.e., drinks that are not in factory sealed containers, as it prevents tipping of the drinks and the resulting spillage. However, the disclosed embodiments may be used as well with factory sealed drinks.

Figure 7:
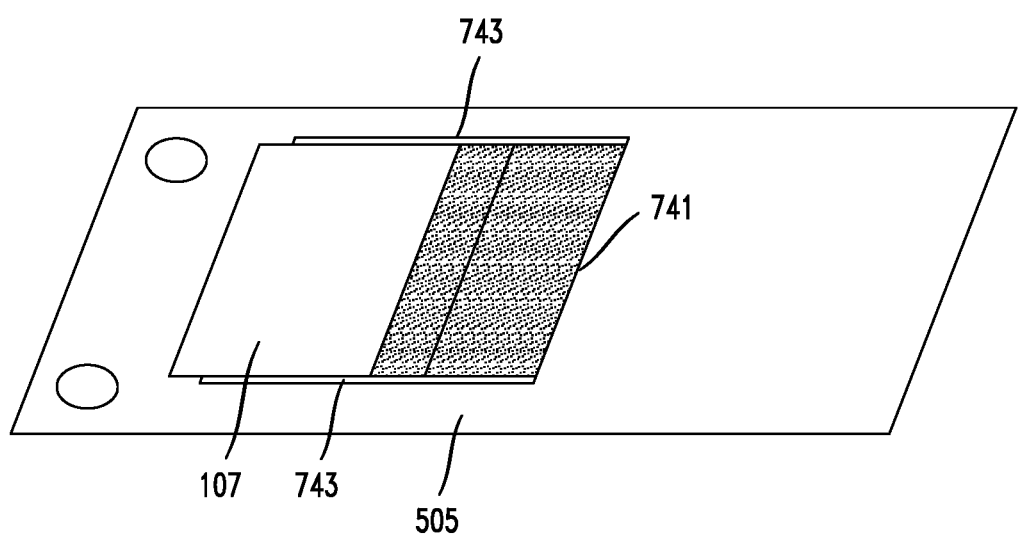
FIG. 7 shows a sliding panel mounted to a lid to adjust the size of a receptacle area to accommodate different sized drink carriers.

FIG. 7 shows sliding panel 741 mounted to lid 505 to adjust the size of receptacle area 107 to accommodate different sized drink carriers. Sliding panel may slide within rails 743. Sliding panel may be locked into one of several preset positions using any known locking mechanism (not shown) such as pegs, which may be spring activated, screws or bolts, Velcro, and the like. For example, there may be various holes in lid 505, which may be threaded, and a peg or bolt may be placed through a hole in sliding panel 741 when the hole of sliding panel 741 aligns with a desired hole of lid 505.

Although only a single sliding panel is shown in FIG. 7, those of ordinary skill in the art will readily recognize that more than one such panel may be employed, e.g., to facilitate adjusting the size of receptacle area 107 in two dimensions or from more than one direction. Those of ordinary skill in the art will also readily recognize that any sliding panel may be arranged to be above or below the lid to with which it is being employed. Those of ordinary skill in the art will further readily recognize that such sliding panels may be used with other embodiments than the one shown in FIGS. 5-7, e.g., they may be employed with the embodiments shown in FIGS. 1-4 or any other embodiment employing a receptacle area such receptacle area 107.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

What is claimed is:

1. A carrier for holding take-out food and at least one drink in a vehicle, the carrier comprising:
   a rigid housing defining a first section and a second section separated by a wall;
   a lid covering only the first section; wherein the lid includes a receptacle area for accommodating a restaurant drink carrier, the receptacle area being adjustable in size to accommodate drink carriers from different restaurants with different dimensions; and
   at least one strap coupled to the housing for fastening the carrier to the vehicle.

2. The carrier as defined in claim 1, wherein the housing is shaped as one of a box, hollow rectangular parallelepiped, and hollow cuboid.

3. The carrier as defined in claim 1, further comprising at least one hook mounted to the housing, the hook suitable for hanging a shopping bag.

4. The carrier as defined in claim 3, wherein the at least one hook is positioned on the housing so as to allow a shopping bag hanging from the hook to hang down into a seat well of the vehicle.

5. The carrier as defined in claim 1, wherein at least one of the drinks is a fountain drink.

6. The carrier as defined in claim 1, wherein at least one of the drinks is not a factory sealed drink.

7. The carrier as defined in claim 1, wherein the at least one strap passes through an opening in the lid; whereby the lid is stabilized with respect to motion of the housing.

8. The carrier as defined in claim 1, wherein the drink carrier is a disposable drink carrier.

9. The carrier as defined in claim 1, wherein the at least one strap prevents the housing from moving with motion of the vehicle.

10. The carrier as defined in claim 1, wherein the lid is insulated.

11. The carrier as defined in claim 1, wherein the housing is insulated.

12. The carrier as defined in claim 1, wherein the lid portion is permanently attached to the housing.

13. The carrier as defined in claim 1, further comprising an additional lid for covering the second section.

14. The carrier as defined in claim 13, wherein the additional lid portion is insulated.

15. A carrier for holding take-out food and at least one drink in a vehicle, the carrier comprising:
   a rigid housing defining a first section and a second section separated by a wall;
   a shelf within the first section; wherein the shelf includes a receptacle area for accommodating a restaurant drink carrier, the receptacle area being adjustable in size to accommodate drink carriers from different restaurants with different dimensions; and
   at least one strap coupled to the housing for fastening the carrier to the vehicle.

* * * * *